United States Patent [19]
Erhart

[11] Patent Number: 4,912,730
[45] Date of Patent: Mar. 27, 1990

[54] HIGH SPEED RECEPTION OF ENCODED DATA UTILIZING DUAL PHASE RESYNCHRONIZING CLOCK RECOVERY

[75] Inventor: Richard A. Erhart, Boynton Beach, Fla.

[73] Assignee: Harris Corporation, Melbourne, Fla.

[21] Appl. No.: 252,393

[22] Filed: Oct. 3, 1988

[51] Int. Cl.⁴ .............................................. H04L 7/02
[52] U.S. Cl. ..................................... 375/110; 328/72; 375/87
[58] Field of Search ................. 375/20, 106, 110, 119, 375/120, 87; 328/63, 72, 109, 155; 329/50, 104, 311, 358, 360, 361; 360/52

[56] References Cited

U.S. PATENT DOCUMENTS

| | | | |
|---|---|---|---|
| 4,208,724 | 6/1980 | Rattlingourd | 375/118 X |
| 4,385,395 | 5/1983 | Tanaka et al. | 375/110 |
| 4,426,714 | 1/1984 | Ashida | 375/110 |
| 4,535,459 | 8/1985 | Hogge, Jr. | 375/120 |
| 4,606,053 | 8/1986 | Schroder | 375/87 |
| 4,617,678 | 10/1986 | Devensky et al. | 375/102 |
| 4,661,965 | 4/1987 | Maru | 375/110 |
| 4,667,333 | 5/1987 | Butcher | 375/106 |
| 4,675,885 | 6/1987 | Gagliardi et al. | 375/110 |

Primary Examiner—Benedict V. Safourek
Attorney, Agent, or Firm—Antonelli, Terry & Wands

[57] ABSTRACT

A mechanism for recovering respective binary states of an input data signal in synchronism with transitions of the input data signal carries out the following sequence of steps. First, the binary state of the input data signal is sampled in accordance with consecutively occurring transitions of a high speed clock signal, the repetition frequency of which is at least three times the data transition rate. Upon the occurrence of a difference in binary state of successive samples of the input data signal at consecutive transitions of the clock signal, a signal representative of such a change is generated. In response to this change of state or transition-representative signal, the binary state of a delayed version of the input data signal, at a time whereat the input data signal is stable, is sampled. In order to reliably monitor the state of the communication link over which the data is transmitted, the binary state of the input data signal is periodically sampled. In addition, to prevent anomalies or 'glitches' in the input data signal from erroneously being detected as data transitions, once the binary state of the input data signal is sampled, any further sampling is prevented for a prescribed period of time subsequent to that sampling, thereby permitting the data to stabilize.

10 Claims, 2 Drawing Sheets

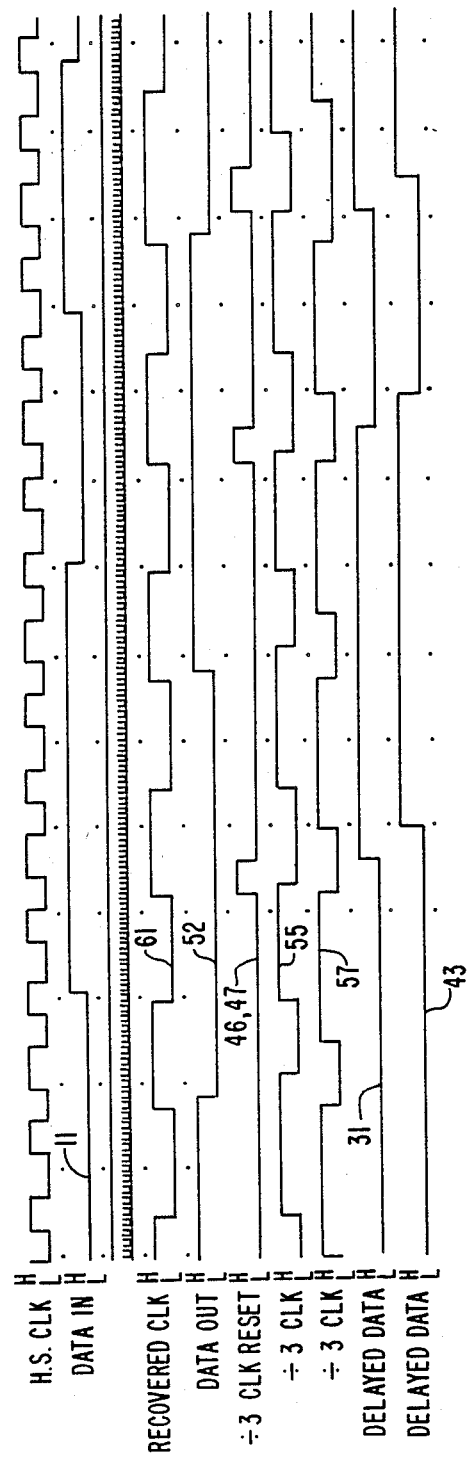

HIGH SPEED RECEPTION OF ENCODED DATA UTILIZING DUAL PHASE RESYNCHRONIZING CLOCK RECOVERY

FIELD OF THE INVENTION

The present invention relates to digital data communication systems and is particularly directed to a scheme for accurately recovering encoded digital data and an associated synchronized clock.

BACKGROUND OF THE INVENTION

Communication systems employing techniques for bit synchronization must trade off hardware complexity for accuracy of synchronization. The most important parameter affecting the type of hardware needed is the noise coupled into the incoming data stream. Noise which manifests itself as duty cycle variations in the data stream can be handled with various techniques. When the signal-to-noise ratio is low, techniques are typically employed which recover an "average" frequency over many data transitions. The lower the signal-to-noise ratio, the more data transitions must be included in the averaging process to accurately recover data, which complicates the hardware.

In strong signal conditions it is possible to accurately recover data using a single transition period for synchronization (assumes prior knowledge of the bit rate). Digital circuits using this method for bit synchronization utilize a clock which is a substantial multiple of the transition rate (usually no less than six times) to allow for synchronization with respect to the modulation transitions. As the data rate increases it becomes more difficult to operate the digital circuitry at this multiplier of the data rate. Analog techniques are typically employed when the data transition rate is significantly higher than 25 Mbit/s.

In communication systems where size and cost are significant production and utilization control factors, the use of separate or auxiliary signal processing networks may not be either practical or even realizable. In a digital CMOS system, for example, the translation of a communication system design into a semiconductor (e.g. silicon) chip mandates a maximum utilization of the resources of the wafer and avoidance of hybrid or off-chip components, making the above-referenced clock-/data recovery mechanisms unattractive from both a production and a cost standpoint.

SUMMARY OF THE INVENTION

In accordance with the present invention, the drawbacks of conventional data recovery schemes are obviated by a new and improved, all digital circuit for recovering both encoded data (e.g. Manchester-encoded data) and an associated clock signal synchronized with the data. To this end the present invention involves a method and apparatus for recovering respective binary states of an input data signal in synchronism with data modulation transitions of the input data signal by carrying out the following sequence of steps. First, the binary state of the input data signal is sampled in accordance with consecutively occurring transitions of a high speed clock signal, the repetition frequency of which is at least three times the data transition rate. Upon the occurrence of a difference in binary state of successive samples of the input data signal at consecutive transitions of the clock signal, a signal representative of such a change is generated. In response to this change of state or transition-representative signal, the binary state of a delayed version of the input data signal, at a time prior to the detected change (i.e. at a time whereat the input data signal is stable), is sampled.

In order to reliably monitor the state of the communication link over which the data is transmitted, the binary state of the input data signal is periodically sampled (i.e. irrespective of any difference between successive samples of the binary state of the input data signal at consecutively occurring transitions of the clock signal). In addition, in order to prevent anomalies or 'glitches' in the input data signal from erroneously being detected as data transitions, once the binary state of the input data signal is sampled, any further (subsequent) sampling is prevented for a prescribed period of time subsequent to that sampling (thereby permitting the data to stabilize).

BRIEF DESCRIPTION OF THE DRAWINGS:

FIG. 2 illustrates a set of waveforms associated with respective components of the logic circuit diagram shown in FIG. 1.

DETAILED DESCRIPTION

Figure 1:
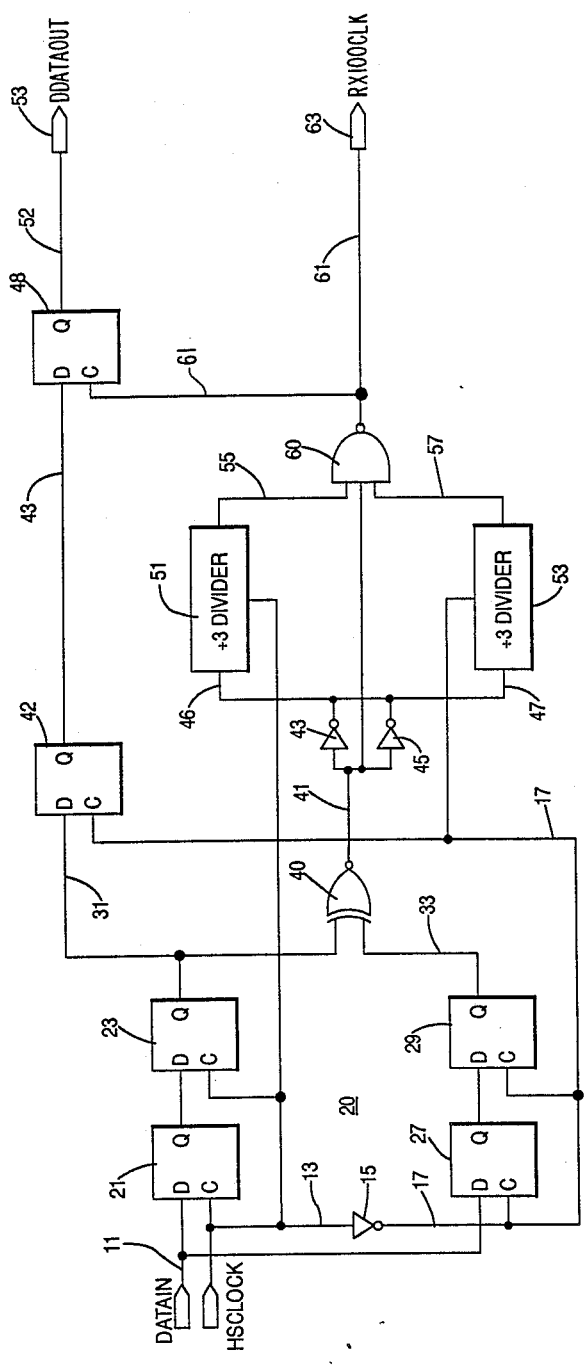
FIG. 1 diagrammatically illustrates a logic circuit diagram of the data and clock recovery mechanism according to the present invention.

Referring now to FIG. 1, there is illustrated a logic circuit diagram of the data and clock recovery mechanism according to the present invention. As described briefly above, the modulation format of the encoded data stream to be recovered in accordance with the mechanism of the present invention is assumed to be a split-phase or Manchester-encoded although it should be observed that the invention is not limited to such a modulation format; the example given is only for purposes of illustration. In the following description, it will be assumed that the data rate is on the order of 50 Mpbs and the high speed clock which is used o sample the date as a frequency on the order of 300 MHZ. It should be observed, however, that the present invention is not limited to these or any other parametric values; the numbers given are simply to illustrate practical values encountered in present day digital communication networks.

The data stream to be recovered is coupled over an input data link 11 to a data sampling circuit 20. The high speed clock (which, as noted previously, is preferably on the order of six times the transition rate of the data, although it may be as low as three times the transition rate) is derived from a suitable precision clock source and applied over link 13 to data sample circuit 20.

As shown in FIG. 1, data sampling circuit 20 is comprised of a pair of cascaded flip-flop sections, comprising respective flip-flops 21 and 23 connected in cascade and a pair of flip-flops 27 and 29 connected in cascade and coupled effectively in parallel with cascaded flip-flops 21 and 23. Input data link 11 is coupled to the D input of flip-flop 21, the Q output of which is coupled to the D input of flip-flop 23, the Q output of which is coupled to output link 31 to the D input of a downstream delay flip-flop 42. Link 31 from the Q output of flip-flop 23 is further coupled to a first input of a transition detector (exclusive OR circuit) 40. Each of cascaded flip-flops 21 and 23 is clocked by the high speed clock coupled over link 13.

Data link 11 is further coupled to the D input of flip-flop 27, the Q output of which is coupled to the D input of flip-flop 29, the Q output of which is coupled over link 33 to a second input of transition detector 40. Cascaded flip-flops 27 and 29 are clocked by the complement of the high speed clock which is coupled over link 13 through inverter 15 to link 17. Link 17 is further coupled to the clock input of delay flip-flop 42.

Each of the flip-flops of the logic circuit shown in FIG. 1 is triggered on the positive-going edge of its applied clock signal. Consequently, within data sampling circuit 20, each of cascaded flip-flops 21 and 23 latches the logic level applied to its D input on the positive going edge of the high speed clock applied over link 13, whereas each of cascaded flip-flops 27 and 29 latches the logic level applied to its D input on the negative going edge of the high speed clock (as a result of the complementing action of inverter 15). The use of cascaded flip-flops 21-23 and 27-29 enables data sampling circuit 20 to latch and hold (for an additional clock cycle) the logic level of a data input signal on link 11.

Transition-detecting exclusive-OR circuit 40 effectively compares the logical difference between the contents of flip-flops 23 and 29 (corresponding to successive samples of the input date signal derived at consecutively occurring transitions in the high speed clock signal) and supplies an output over link 41 in response to a difference between successive samples. When the binary state of the input data signal is stable, (whether it be a high level or low level) the output of transition-detecting exclusive-OR circuit 40 will remain unchanged. However, as will be described in detail blow, when the binary state of the input date signal changes from a high level to a low level or from a low level to a high level, such a change will cause unequal inputs to be supplied (via data sampling circuit 20) to exclusive OR circuit 40, which, in turn, will produce an output on link 41 indicating that there has been a change in state or a transition in the level of the input data signal.

Link 41 is coupled through a pair of inverters 43 and 45 to couple respective reset signals over lines 46 and 47 to each of respective divide-by-three dividers 51 and 53, so as to synchronize the operation of dividers 51 and 53 with transitions in the data input signal. Respective dividers 51 and 53 are driven by the high speed clock supplied over link 13 and its complement supplied over link 17 and continuously produce output signals over links 155 and 57 representative of the high speed clock but having frequency one-third that of the input. As is shown in FIG. 2, the duty cycle of each of the clock signals supplied from clock dividers 51 and 53 is one-third low and two-thirds high.

The divided clock signals are supplied over links 55 and 57 to respective inputs of a NAND gate 60, a second input of which is coupled over link 41 from the output of exclusive-OR transition detector circuit 40. The output of NAND gate 60 is coupled over link 61 to a clock input of a sampling flip-flop 48 and to an output clock terminal 63. NAND gate 61 serves to generate a recovered clock signal which is employed as a sampling control signal n response to which the incoming Manchester code is regenerated through the operation of sampling flip-flop 48. The D input of sampling flip-flop 48 is coupled over link 43 to the Q output of delay circuit 42. The Q output of sampling flip-flop 48 is coupled over link 52 to an output terminal 53 at which the recovered data signal.

As will be explained below, the combination of the high speed clock, clock dividers 51 and 53 and NAND gate 60 serve to generate a clock signal, which is applied to sampling flip-flop 48, so that the monitored binary level of the input data signal may be sequentially sampled. The output of exclusive OR circuit 40 is used as a reset control signal for each of the dividers 51 an 53 and effectively serves as an override to the clock signal that is normally periodically produced from NAND gate 60 and forces the clock to be synchronized with transitions in the input data signal is detected.

Operation

In order to facilitate an understanding of the operation of the present invention, attention is directed to FIG. 2 which illustrates a set of waveforms associated with respective components of the logic circuit diagram shown in FIG. 1, the respective reference numerals for which are identified with the waveforms of FIG. 2. For purposes of providing a timing reference, the consecutively occurring edges (both positive-going and negative-going) of the high speed clock are denoted with timing reference symbols Ti.

Assuming that the system has been running for some arbitrary period of time, the high speed clock signal on input link 13 is shown as transitioning from a high level t a low level at time T0 and thereafter alternately transitioning from low to high and high to low levels as shown in FIG. 2. Namely, the high speed clock signal transitions from a low level to a high level at odd numbered timing increments (e.g. at T1, T3, T5 . . . ) and transitions from a high level to a low level on even numbered timing increments (e.g. T2, T4, T6 . . . ).

At time T0, the binary level of the input data signal on link 11 is shown as a low level. For the moment, the recovered data output signal on link 53 and the recovered clock signal on link 63 will be ignored. The respective clock signals that are produced by dividers 51 and 53 on links 55 and 57 are shown as having the above-referenced duty cycle which is one-third low, two-thirds high, occurring at a frequency one-third that of the high speed clock, as noted previously. The logic levels on links 31 and 43 are also shown to be low.

As the binary level of the input data signal on link 11 remains low, the transitions of the high speed clock signal cause the cascaded flip-flops 21-23 and 27-29 of data sampling circuit 20 to repeatedly clock in the low logic level on link 11. As long as the logic level on link 11 remains low, exclusive OR circuit 40 will see the same logic level at each of its inputs 31 and 33, so that its output will not change state. Meanwhile, divide-by-three clock generators 51 and 53 continue to produce their respective output signals, so that, with the low input on link 41 from exclusive OR circuit 40 and periodically changing outputs on links 55 and 57 from clock circuits 51 and 53, NAND circuit 60 will produce a sampling control signal on link 61 at one-third the frequency of the high speed clock (as defined by the dividers 51 and 53), whereby the currently low logic level on link 43 will be latched in flip-flop 48 and supplied over output link 52. As mentioned previously, for the moment, the high logic level on link 52 between clock times T0 and T5 (which relates to a previous transition in the data input signal, not addressed here) will be ignored.

Referring again to the input data signal shown at 11 in FIG. 2, between clock times T7 and T8, the input data signal undergoes a binary level transition from a low state to a high state. At time T7, the low logic level is latched by flip-flop 21. At time T8, with a low-to-high transition of the input data signal having occurred, flip-flop 27 will latch the high level as a result of the application of the high speed clock signal on link 17. Thereafter, at time T9, flip-flop 21 will latch the high level, whereas the previous contents of flip-flop 21 are shifted into flip-flop 23. At time T10, the high level contents of flip-flop 27 are shifted into flip-flop 29 and flip-flop 27 latches the continuing high state on input link 11. Since flip-flops 23 and 29 have now latched respectively opposite logic levels (the Q output of flip-flop 23 being low as latched from flip-flop 21 at time T7 and the Q output of flip-flop 29 being high as latched from flip-flop 27 at time T8) exclusive-OR gate 40 will produce an output on link 11, resetting dividers 51 and 53 and forcing the output of NAND gate 60 to change state. Namely, transition-detecting exclusive-OR circuit 40 produces a signal that acts as an override to the dividers 51 and 53, so that NAND gate 60 supplies a sampling control signal over link 61 to the clock input of flip-flop 48.

As pointed out previously, delay flip-flop 42 provides an effective delay of one-half a clock cycle (as flip-flop 42 is clocked by the negative going edge of the high speed clock via link 17). As a consequence, the binary state of input link 43 to the D input of sampling flip-flop 48 corresponds to the binary level of the data input signal on link 11, delayed by two and one-half clock cycles. In other words, the binary level on link 43 corresponds to the level of the input data signal on link 11 at time T7, which falls approximately midway of the baud period of the input data signal, and thereby occurs at a time with a likelihood of a transition in the data signal is at a minimum. Thus, the logic level on output link 52 continues to remain low, so as to correspond to the low logic level on input data link 11 between time T0 and a time between clock transitions at times T7 and T8.

At time T11, the high speed clock transitions from a low level to a high level, so as to transfer the high logic level latched by flip-flop 21 into flip-flop 23. As a result, the Q output of each of flip-flops 23 and 29 is now high, so that exclusive OR circuit 40 sees the same logic level on each of its inputs 31 and 33, causing its output to change state from a high level to a low level at a time just subsequent to time T11. As the logic level on input data link 11 remains high, the respective cascaded flip-flop pairs of data sampling circuit 20 continued to clock in the same logic levels, so that transition detector 40 does not change state. As a consequence, the sampling control signal at the output of NAND gate 60 on link 61 is effectively defined in accordance with the logical combination of the divided clocks produced by clock circuits 51 and 53, as described above. In particular, as shown in FIG. 2, with the output of exclusive-OR gate 40 being low, the recovered clock signal produced by NAND gate 60 on link 61 changes state from a low level to a high level upon the occurrence of a negative-going transition of the divided clock output of divider 53 on link 57, and changes state from a high level to a low level upon the occurrence of a positive-going transition of the divided clock output of divider 51 on link 55.

At time T12, the negative-going transition of high speed clock 13 clocks the contents of link 31 (now at a high logic level) into delay flip-flop 42, so that sampling flip-flop 48 now sees a high logic level at its input 43. As clock dividers 51 and 53 continue to produce respective divided clock signals on links 55 and 57, NAND gate 60 produces a sampling control signal at the time of the negative-going transition on link 57 between clock times T16 and T17, causing the logic level on output link 61 to change from a low state to a high state, which clocks the now high input logic level on link 43 into sampling flip-flop 48, thereby causing the state of output link 52 to change state from a low state to a high state. In other words, the binary state of output link 52 lags the binary state of link 43 by approximately the high portion of the duty cycle of clock divider 53. The state of link 43 effectively is delayed with respect to the input data by approximately two and one-half high speed clock cycles, in order to ensure that the logic level on input data link is stable when sampled. Thus, respective binary levels of the output data signal on link 52 accurately track the binary levels of the input data signal on link 11. Moreover, by the action of transition detector 40, the internally generated clock signal (by the action of dividers 51 and 53 and NAND gate 60) is continuously synchronized with transitions in the input data signal.

As noted previously one of the features of the present invention is the fact that the input data is sampled at a time that is offset sufficiently from a detected transition to ensure a high degree of confidence that the sampled data state is effectively stable (either a high level or a low level) so that there is a high probability that the recovered replica of the encoded data signal accurately tracks what was originally transmitted. By referencing the sampling point to a time prior to a detected transition, and preferably midway of the baud period, it can be reasonably assumed that the sampled level of the data signal is correct. Moreover, by preventing additionally detected transitions occurring within a prescribed clock window) from participating in the sampling process, erroneous misssampling of the data is avoided.

While I have shown and described an embodiment in accordance with the present invention, it is to be understood that the same is not limited thereto but is susceptible to numerous changes and modifications as known to a person skilled in the art, and I therefore do not wish to be limited to the details shown and described herein but intend to cover all such changes and modifications as are obvious to one of ordinary skill in the art.

What is claimed is:

1. An apparatus for recovering respective binary states of an input data signal in synchronism with transitions of said input data signal, and generating an output signal representative thereof comprising:
   first means, coupled to receive said input data and a digital clock signal, for sampling the binary state of said input data signal in accordance with successive positive-going transitions in said digital clock signal;
   second means, coupled to receive said input data and said digital clock signal, for sampling the binary state of said input data signal in accordance with successive negative-going transitions in said digital clock signal;
   third means, coupled to said first and second means, for generating a first signal representative of a change in said input data signal from one binary state to another in accordance with a prescribed relationship between respective samples of the binary state of said input data signal as sampled by said first and second means at consecutively occurring transitions of said digital clock signal; and fourth means, coupled to one of said first and second means, and to said third means, for sampling a delayed version of a sampled binary state of said input data signal as sampled by said one of said first and second means, at a time that is displaced with respect a change in the binary state of said input data signals as represented by the generation of said first signal, and producing an output signal representative thereof.

2. An apparatus according to claim 1, wherein said digital clock signal has a repetition rate that is at least three times the encoded data rate of said input data signal.

3. An apparatus according to claim 1, wherein said third means includes means for generating said first signal in response to a difference between respective samples of the binary state of said input data signal as sampled by said first and second means at consecutively occurring transitions of said digital clock signal.

4. An apparatus according to claim 1, wherein said fourth means includes clock divider means, coupled to receive said digital clock signal and said first signal, for generating a sampling control clock, through which said delayed version of a sampled binary state of said input data signal is sampled, at a frequency lower than the frequency of said digital clock signals.

5. An apparatus according to claim 4, wherein said fourth means includes means for resetting said clock divider means in response to said first signal.

6. A method for recovering respective binary states of an input data signal in synchronism with transitions of said input data signal, and generating an output signal representative thereof comprising the steps of:

(a) sampling the binary state of said input data signal in accordance with successive positive-going transitions in a digital clock signal;

(b) sampling the binary state of said input data signal in accordance with successive negative-going transitions in said digital clock signal;

(c) generating a first signal representative of a change in said input data signal from one binary state to another in accordance with a prescribed relationship between respective samples of the binary state of said input data signal as sampled in steps (a) and (b) at consecutively occurring transitions of said digital clock signal; and (d) sampling a delayed version of a sampled binary state of said input data signal, as sampled in one of steps (a) and (b), at a time that is displaced with respect a change in the binary state of said input data signals as represented by the generation of said first signal in step (c), and producing an output signal representative thereof.

7. A method according to claim 6, wherein said digital clock signal has a repetition rate that is at least three times the encoded data rate of said input data signal.

8. A method according to claim 6, wherein step (c) includes generating said first signal in response to a difference between respective samples of the binary state of said input data signal as sampled in steps (a) and (b) at consecutively occurring transitions of said digital clock signal.

9. A method according to claim 6, wherein step (d) includes the step of generating a sampling control clock, through which said delayed version of a sampled binary state of said input data signal is sampled, at a frequency lower than the frequency of said digital clock signals.

10. A method according to claim 9, wherein step (d) resetting said sampling control clock in response to said first signal.

* * * * *